Nov. 10, 1959    R. B. ALLURED ET AL    2,912,105
HARDNESS TESTING AND SORTING
Filed May 28, 1954    7 Sheets-Sheet 1

Inventor
Robert B. Allured &
John L. Walker
By L. D. Burch, Attorney

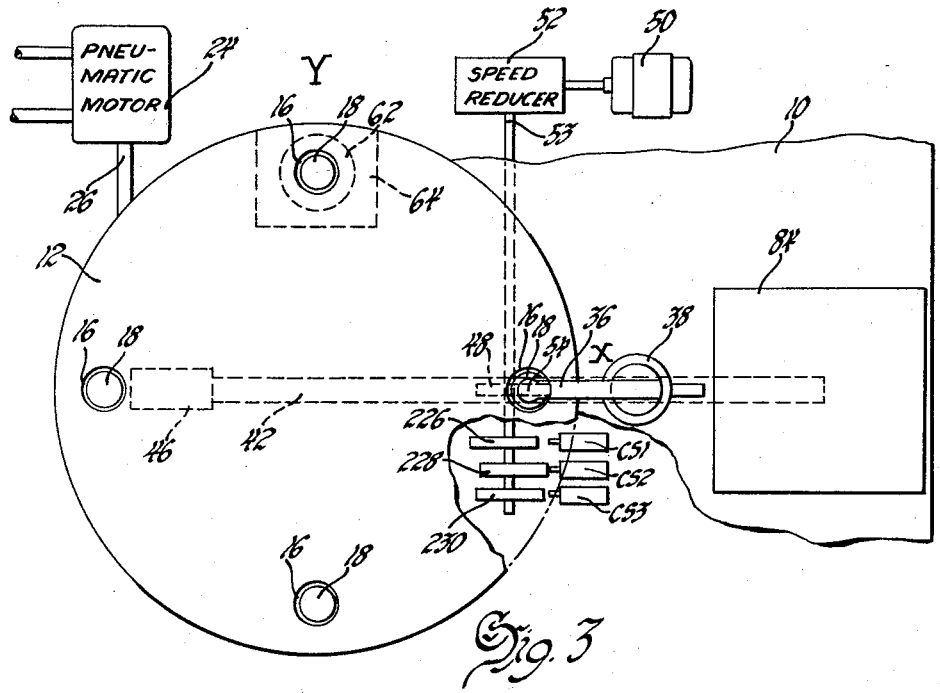
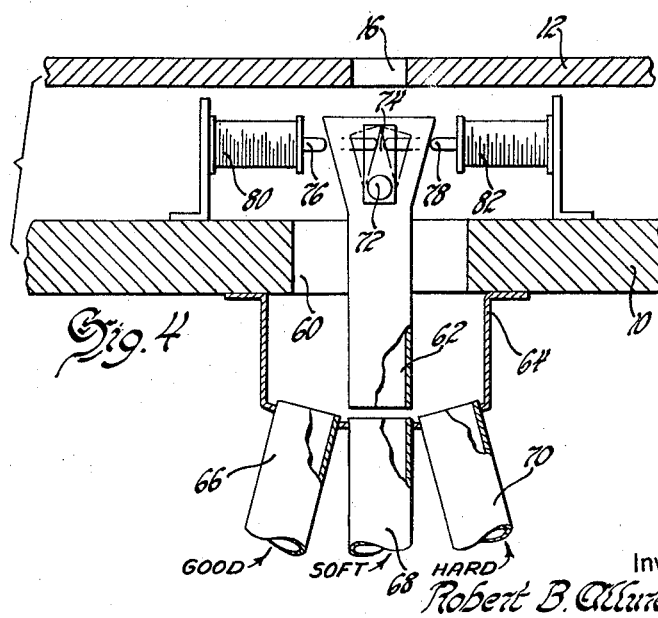

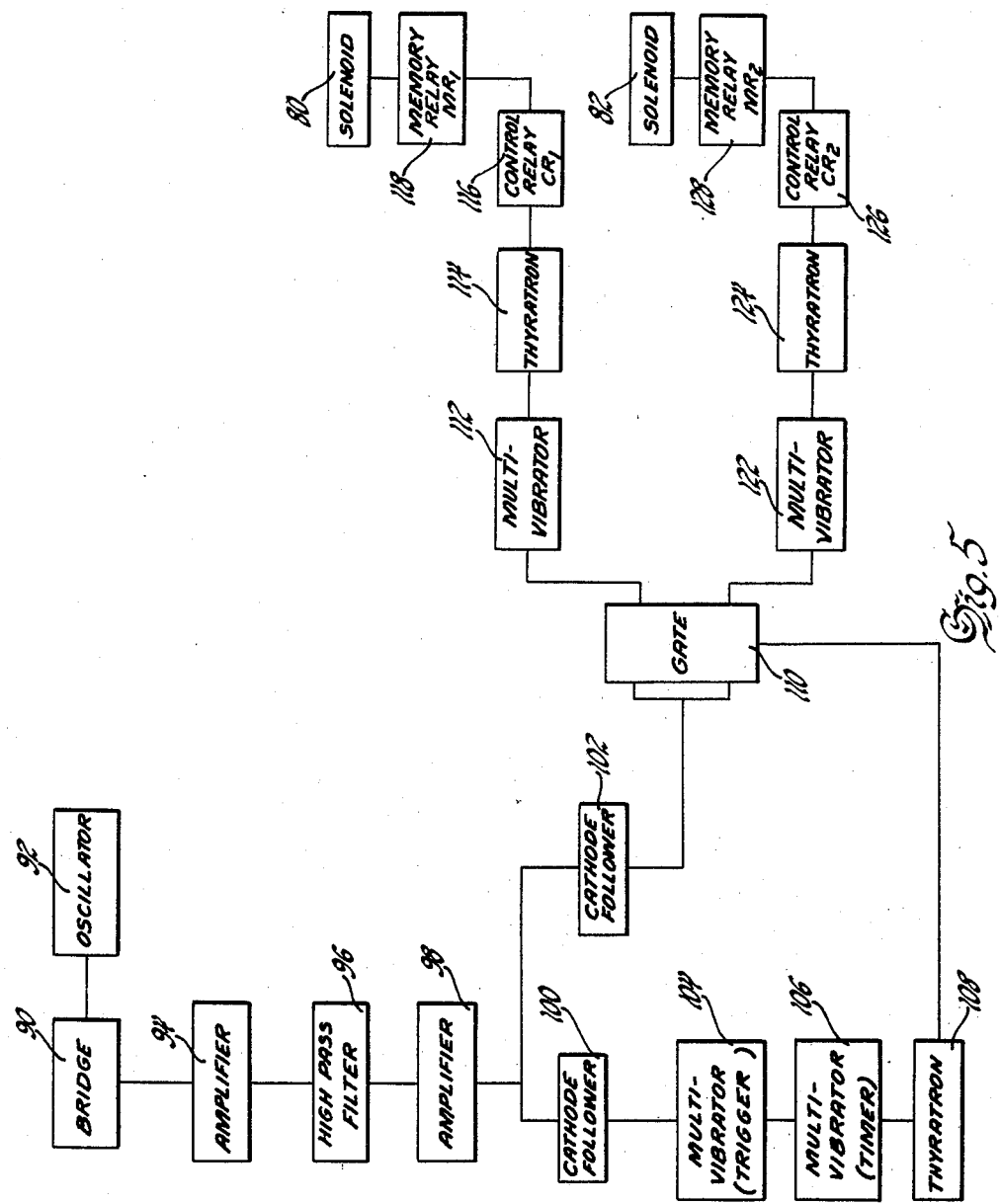

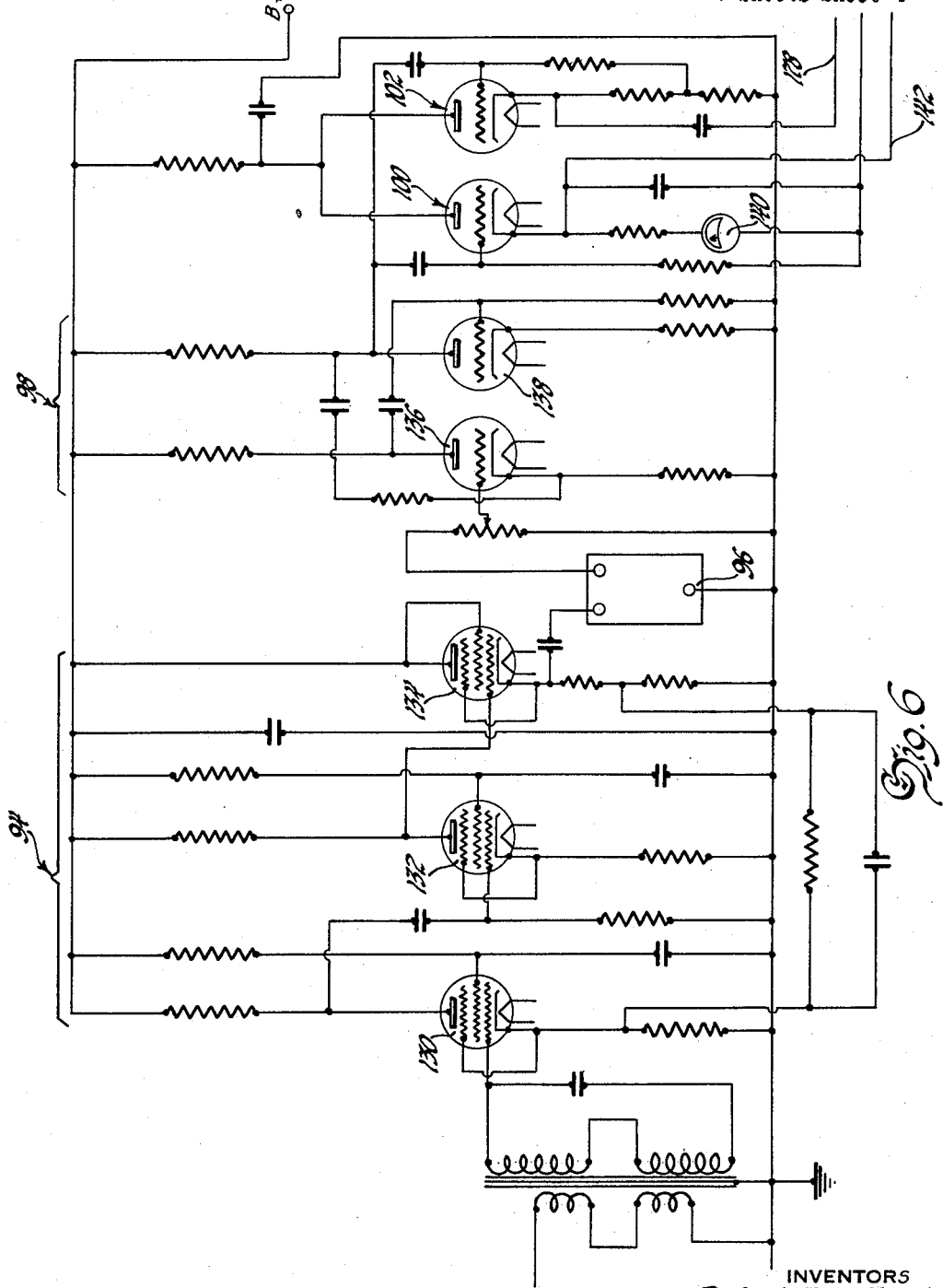

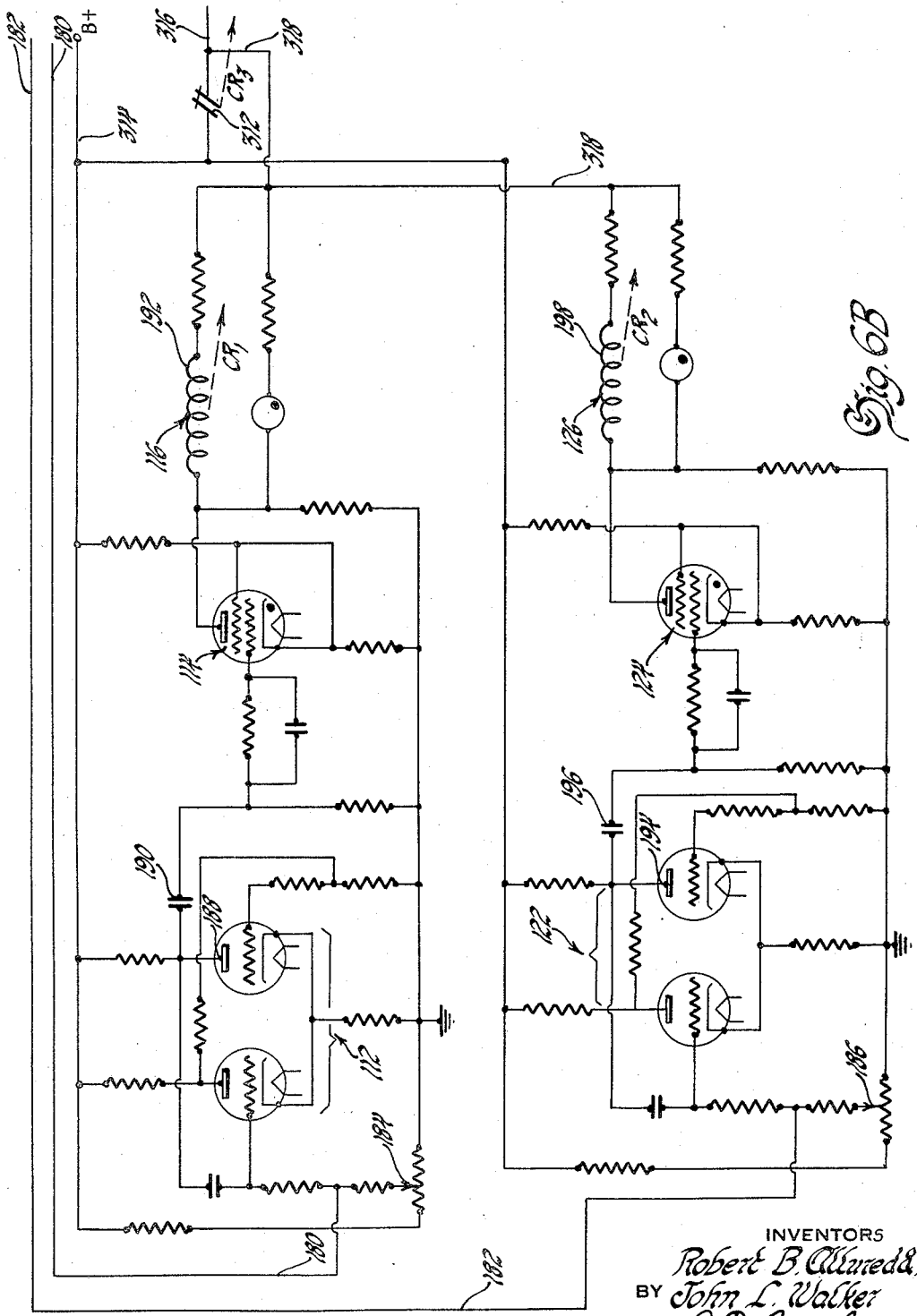

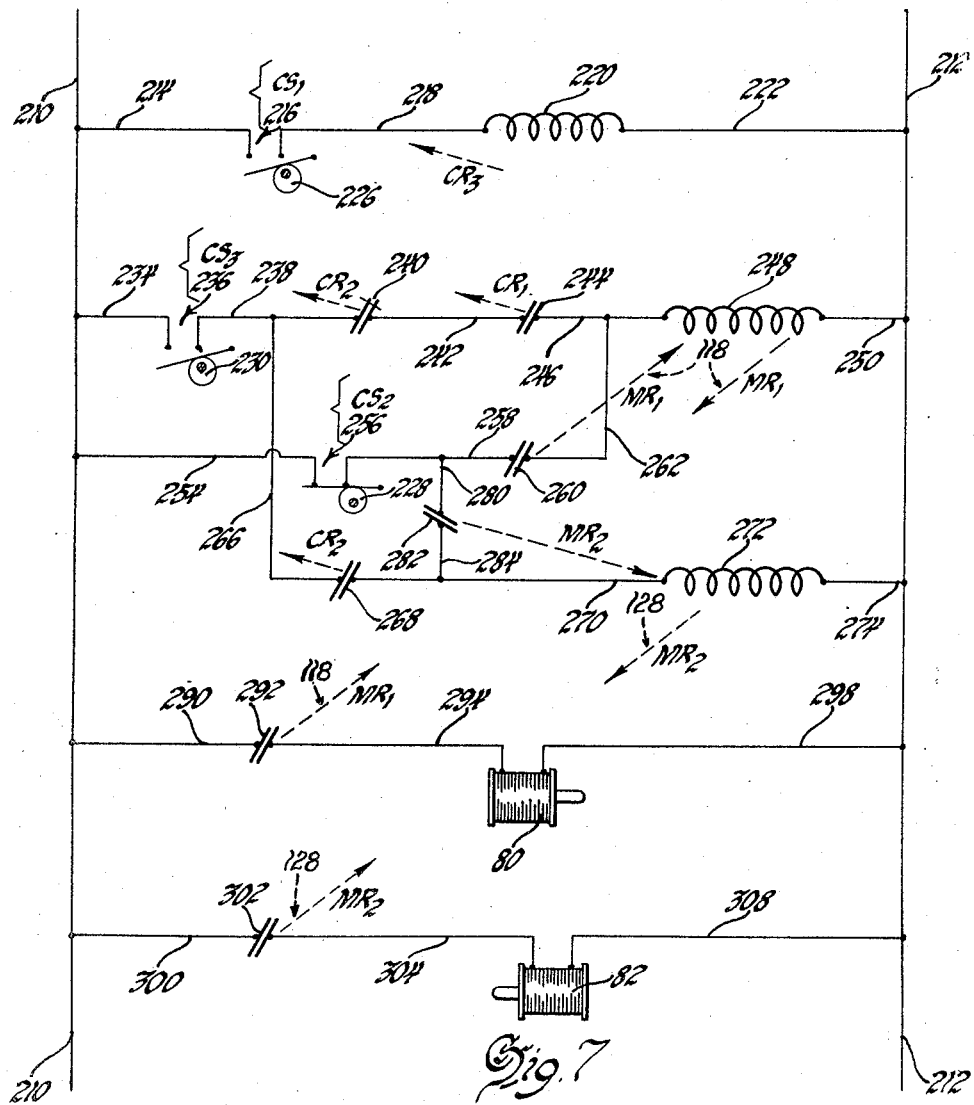

United States Patent Office 2,912,105
Patented Nov. 10, 1959

2,912,105
HARDNESS TESTING AND SORTING
Robert B. Allured and John L. Walker, Detroit, Mich., assignors to General Motors Corporation, Detroit, Mich., a corporation of Delaware
Application May 28, 1954, Serial No. 433,086
3 Claims. (Cl. 209—79)

This invention relates generally to material hardness testing and, more particularly, to a method of and apparatus for measuring the hardness of material specimens. The invention further relates to penetration-type hardness testers and, in its more specific aspects, to such apparatus suited for high production hardness checking and sorting of material specimens.

In distinction to commonly employed forms of penetration-type hardness tests of the Brinell and Rockwell variety in which either the diameter or the depth of indentation made by a suitable indenter or penetrator is measured to determine the hardness of the material, the present invention measures the hardness of the material as a function of the resistance to penetration offered by the specimen in terms of the time rate of strain or dynamic load induced therein or loading system under the application of a predetermined load thereto.

In the Brinell test a predetermined load is applied to the specimen through a suitably shaped indenter for a specified length of time, and the diameter of the impression is visually measured. In the Rockwell test two different loads are employed, one to preload the indenter and the other to indent, and an accurate measurement of the depth of the impression is made. Both of these measuring procedures require an appreciable expenditure of time in relation to that of the present invention and, depending as they do on visual measurements of a dimension of an indentation and upon operator judgment, are not readily suited for incorporation in automatic high speed hardness checking machines. Moreover, the accuracy of the measurements obtained with the above devices is seriously impaired by part surface conditions, irregularities and variations in which make depth measurements unreliable. Such apparatus, moreover, may not be capable of employment in cases where, as a result of the shape or configuration of the part to be tested, no reference line is available on the part for a length or depth of penetration measurement.

The present invention thus seeks generally to provide an improved method of and apparatus for testing the hardness of material specimens such as avoids the aforementioned and other deficiencies or limitations of prior art hardness testing devices of the character described.

More specifically, the invention has among its objects to provide a method of and apparatus for hardness testing which do not require visual observations or measurements nor depend upon operator skill or judgment, which are not limited by surface conditions or shape of the part nor require a reference line on the part for a length or depth of penetration measurement, and which are readily suited for incorporation in high speed automatic hardness checking and sorting installations.

The above and other objects, features and advantages of the present invention will appear more fully from the following detailed description and drawings wherein:

Fig. 3 is a top plan view with parts broken away of a part of the apparatus of Fig. 2;

Fig. 4 is a diagrammatic elevational view taken in section of a part of the apparatus employed in Fig. 2;

Fig. 5 is a block diagrammatic illustration of components of the electrical measuring apparatus employed in the present invention;

Figs. 6, 6A and 6B are schematic electrical circuit diagrams of a part of the electrical measuring apparatus of Fig. 5; and Fig. 7 is a schematic electrical circuit diagram of electrical control apparatus employed in the apparatus of the present invention.

Figure 1:
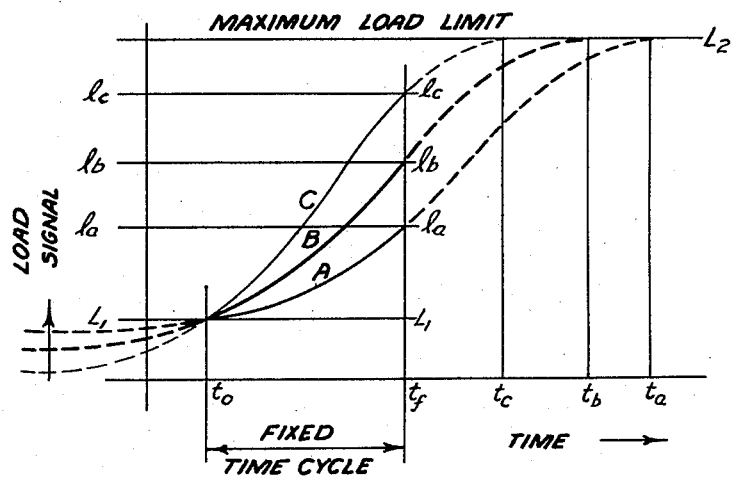
Fig. 1 illustrates a plurality of superimposed dynamic load curves of a number of test specimens subjected to the application of a predetermined load.
Figure 2:
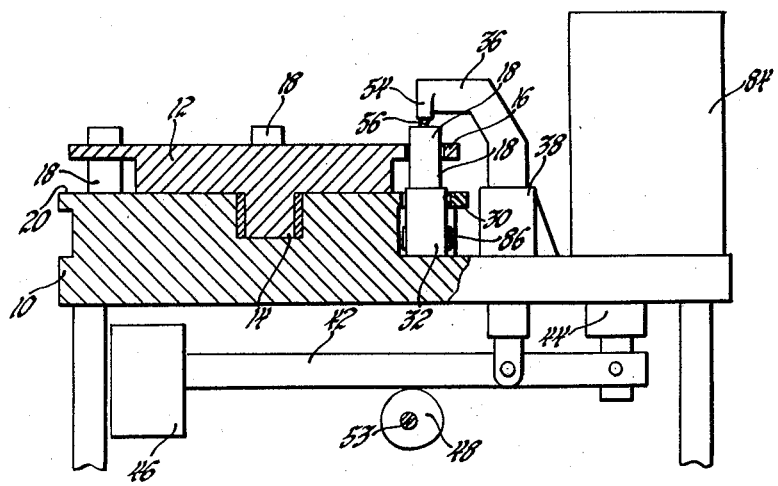
Fig. 2 is a diagrammatic elevational view partly in section of mechanical apparatus employed in the illustrated form of the present invention.

Referring to the drawings, the principles underlying the present invention are illustrated in Fig. 1, the several different curves of which are obtained under dynamic operating conditions in which a steady predetermined load is separately applied to several different test specimens through a suitable indenter or penetrator. The curves are superimposed at an arbitrarily selected low load level $L_1$, which will be the same for each test specimen, and illustrates the time in which the load in the system or the strain in the specimen increases or builds up from the said low level $L_1$ to the maximum applied load level $L_2$. In each case the specimen material is in a plastic flow condition and no elastic recovery is involved.

The curves illustrate that as the indenter is applied, the load in the system does not build up immediately to the value of the applied load $L_2$ but is resisted or delayed by the specimen. A soft specimen—represented by the curve A—offers less resistance to penetration of the indenter and, hence, a longer time is required for the dynamic load to attain the maximum applied value than in the case of harder specimens, as represented by the curves B and C. Otherwise stated, under similar applied load conditions, the penetrator will attain a greater depth of penetration or travel before coming to rest in a soft than in a hard specimen. At the moment the penetrator finally comes to rest within the specimen, the load in the closed mechanical system, comprising the load applying means and the test specimen, will have attained the full value of the applied load, and the system will be in static and dynamic equilibrium. Thus, the time of build-up of load in the system is a function of the relative hardness of the material being tested.

The foregoing suggests measuring the hardness of various materials by the following methods involving time or load under dynamic operating conditions:

(1) Measuring the time interval required to build up a pressure from one predetermined load to another;

(2) Measuring the time interval required for the penetrator to reach a predetermined depth of penetration under the application of a predetermined load;

(3) Measuring the depth of penetration obtained when a predetermined load is applied for a fixed time interval; and (4) Measuring the actual value of the dynamic strain or load in the system when a predetermined maximum load is applied to the specimen for a fixed time.

In the form of the invention shown herein as applied to an automatic hardness checking and sorting installation, a steady load is applied to a material specimen through a suitable indenter, and the actual value of the dynamic strain induced in the specimen from the moment of the application of the load thereto is sensed by strain sensing means which provide an electrical signal corresponding to the dynamic build-up of load in the system. The dynamic strain signal is amplified and employed to trigger or start an accurate fixed electronic timing circuit that is adjusted to close an electronic gating circuit at the end of the fixed timing cycle $(t_o-t_f)$ of the timer. The actual amplitude of the dynamic strain signal at the instant of closure of the gating circuit will then be a measure of the relative hardness of the material specimen, as may be ascertained from Fig. 1. The strain signal also passes through the electronic gating circuit into a sorting circuit which includes electronic relays set to operate at desired levels of signal voltages. The value to which the strain signal has risen at the time the gate closes is the factor which determines which of the relays in the sorting circuit will operate. Since the value of the strain signal is a function of the time rate of build-up load, which in turn is related to the specimen hardness, the relays will classify the material into hardness groups.

In the form of mechanical system that may be employed in the present invention, 10 is a fixed base which rotatably mounts an indexable table 12 having a stub shaft 14 journaled in a suitable bearing in the base 10. The table 12 is provided with a plurality of openings 16 (Fig. 3) therein which are adapted to receive and carry a number of material specimens 18 therein to the checking station indicated at X and thereafter to a disposal station indicated at Y at which the specimen is sorted or classified as to hardness in accordance with the measurement made thereof at the checking stage.

The parts 18 extend through the openings 16 in the table and rest or are slidably supported at their lower ends on the upper surface or machined bed 20 of the base 10 providing a shelf therefor.

The table is adapted to be rotatably indexed by suitable actuating and indicating mechanism including a pneumatic motor 24 or the like, the plunger or actuator rod 26 of which extends under the table to a suitable rack or equivalent means for rotating the table. The base 10 is provided with an opening 30 therein in the vicinity of the checking station and receives a load cell 32 therein rigidly fixed to the base. The load cell 32 may be a generally cylindrical hollow pedestal the upper end of which is closed and forms a platform that receives a part 18 carried by the table to the checking station.

Overhanging the table is a generally L-shaped reciprocable lever member 36 the leg of which passes freely through a guide member 38 mounted on the base. The lever member 36 also passes through the base 10 and is pivotally connected at its lower end to an elongated beam member 42 which is disposed generally parallel to the plane of the horizontal diameter of the table of Fig. 3. One end of the beam 42 is pivotally fastened to a support 44 on the underside of the base, and the other end has a dead weight 46 thereon. Intermediate the weight and the point of connection of the lever 36 to the beam is a cam member 48 which is adapted to contact the beam and is shown driven from a relatively constant speed electric motor 50 through a suitable speed reducer 52, as indicated in Fig. 3.

The arm of the lever member 36 overhanging the table has mounted in a socket or head 54 therein a suitable indenter or penetrator 56, which may be either of the diamond or ball type and which is adapted to contact and penetrate the upper surface of the specimen for application of load thereto. The cam 48 is shaped so as to assure that the load, which will be determined by the product of the dead weight 46 and the length of the lever arm between the weight and the point of attachment of the end of the lever 36 to the beam 42, will be applied to the material specimen at a constant starting velocity. By using a constant starting velocity, the effect of variations in the surface height of different specimens on the hardness reading is eliminated which is an extremely desirable feature in an automatic apparatus of this character.

An elongated opening 60 is provided in the shelf or upper surface of the base 10 at the disposal station Y, as illustrated in Fig. 4, and receives the stem of a pivotally mounted funnel-shaped chute or diverter member 62 having the expanded or enlarged portion thereof disposed between the table and the base, substantially as shown. The neck of the funnel extends through the opening 60 into a compartment or container 64 which is suitably secured to the base and communicates at its lower end with an array of sorting chutes 66, 68 and 70, as illustrated.

The pivot shaft of the funnel-shaped chute member 62 is indicated at 72 and has a short offset arm 74 which is rigidly secured thereto and is adapted to be contacted for arcuate movement of 62 by either one of a pair of plungers 76, 78 of a pair of driving solenoids 80, 82 which are shown mounted on opposite sides of the funnel-shaped member 62 and are adapted to be selectively energized from the electrical measuring apparatus, as will appear below.

The electrical measuring equipment associated with the aforementioned apparatus is housed in a circuit cabinet 84 shown mounted on one side of the base 10. The components of the measuring apparatus are illustrated in the block diagrammatic showing of Fig. 5 described below.

Mounted on opposite sides and on a diameter of the load cell 32 is a pair of Baldwin strain gauge rosettes 86 each of which is composed of a separate pair of normally disposed type SR-4 strain gauges. The strain gauge rosettes are mounted in a convention Wheatstone bridge arrangement 90 one pair of diagonal terminals of which is connected for excitation from an audio frequency oscillator 92 and the conjugate output terminals of which are connected to the input of an amplifier 94 of Fig. 5. The oscillator 92, just as all of the individual electrical stage components employed herein, is of conventional design providing an audio frequency output of, say, around 3,100 c.p.s. and may be of the resistance-capacitance type, for example, such as is illustrated at Figure 24a appearing at page 505 of F. E. Terman's "Radio Engineer's Handbook," published by McGraw-Hill Book Company, 1943.

The amplifier 94 includes a cathode follower stage which is connected to a conventional high pass filter 96 the output of which in turn is connected to a further amplifier stage 98 in which the gain of the over-all system may be controlled. The output of the amplifier 98 is connected to a pair of parallel-connected cathode followers 100, 102, the first of which is connected to a multi-vibrator 104 which acts as a trigger stage for a following regenerative multi-vibrator 106 which acts as a timer and furnishes a predetermined timing cycle $(t_o - t_f)$ timing the operation of a gated buffer section 110. The gated buffer section comprises a pair of parallel-connected cathode followers which receive their input signal from the cathode follower 102 and have their operating plate voltages controlled by the thyratron section 108, as will appear more fully below. One of the branch outputs of the gated buffer is connected to a multi-vibrator 112 which controls a thyratron section 114 having a control or sorting relay 116 ($CR_1$) in the output thereof, the control relay further operating memory relay 118 ($MR_1$) which in turn controls the operation of one of the driving solenoids 80 associated with the pivotable funnel or diverter member 62. The output of the other branch of the gated buffer 110 is connected similarly and includes a multi-vibrator 122, thyratron section 124, control or sorting relay 126 ($CR_2$) which controls the operation of a second memory relay 128 ($MR_2$) that in turn effects the operation of the other of the driving solenoids 82 of Fig. 4.

Figure 6A:
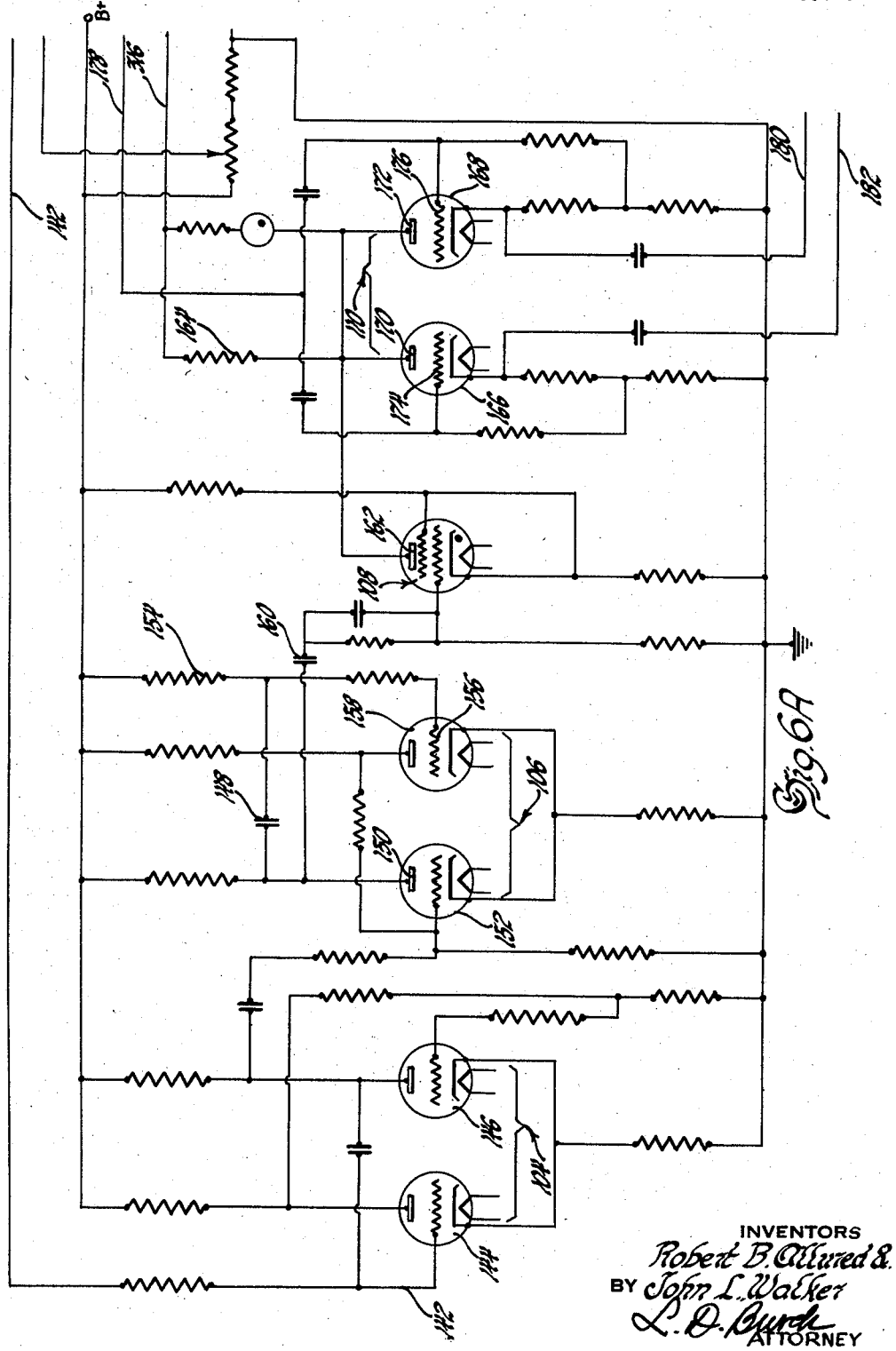

Reference is now made to the electrical schematic diagrams of Figs. 6, 6A and 6B for an explanation of the operation of the timing and gating circuits.

The amplifier 94 is transformer-coupled to the output of the strain gage bridge 90 and includes a pair of negative feed-back stabilized resistance-coupled cascade amplifier stages 130, 132 working into a cathode follower section 134. The cathode follower is coupled to the high-pass filter 96 which functions to suppress any hum and extraneous signals from passing through the measuring apparatus and interfering with the measurement of the dynamic strain signal. The filter is of conventional design and may have a cut-off frequency of, say, around 500 c.p.s. The output of the filter is coupled to the amplifier 98 which may be an adjustable gain stage composed of a pair of cascade resistance coupled stabilized amplifiers 136, 138 working into the parallel-connected cathode followers 100, 102. The cathode follower 100 is operated nearly at cut-off so as to function as an infinite impedance detector providing a direct current output therefrom and has a D.C. milliameter 140 in the cathode leg thereof which indicates the amplitude of the load applied to the test specimen and constitutes a metering circuit in the measuring apparatus.

The output of the cathode follower 100 is applied over conductor 142 to the input of the trigger stage multivibrator 104. The latter is essentially a one-shot cathode coupled multi-vibrator, the normally non-conducting first section 144 of which conducts or triggers when the input signal attains a predetermined critical value corresponding to $L_1$ of Fig. 1 and causes the normally conducting second section 146 thereof to cut off, at which point or time the plate voltage of the second section increases appreciably and passes a positive triggering pulse to the input of the multi-vibrator timer stage 106 to initiate the operation thereof.

The operation of the timer is generally similar to that of the preceding trigger section except that, by reason of the timing circuit constituted by the condenser 148 connected to the plate 150 of the first section 152 of the timer and the resistor 154 connected to the grid 156 of the second half 158 thereof, the drop in the plate voltage of the normally non-conducting first section 152, when it suddenly becomes conducting, is transferred immediately to the grid 156 of the normally conducting second section 158 to keep the latter cut-off after the timer has triggered. The condenser 148 then begins to discharge and to recharge in the opposite direction through the resistor 154, thus raising the potential of the grid 156 of the second section of the timer until it reaches the critical voltage and re-triggers, causing the first section 152 thereof to cut-off and restoring the second section 158 to conducting condition. The increase in plate voltage of 150 when the first section 152 has been restored to cut-off condition now passes a positive pulse, by reason of coupling condenser 160, to the thyratron 108 which is then caused to fire. It thus will be seen that the timing interval of the timing circuit is determined by the charging rate of the condenser 148 and the resistor 154 associated therewith, illustrative values of each of which may be 0.25 micro-farad and 2.0 megohms, respectively, to yield a time constant of 0.178 second.

The plate 162 of the thyratron 108 is connected in series with a voltage-dropping resistor 164 over which is supplied the operating voltage for the parallel-connected dual cathode follower sections 166, 168 of the gated buffer circuit 110. Thus, when the thyratron 108 fires, the increased IR drop across resistor 164 drops the operating voltage supplied to the plates 170, 172 of these cathode followers so as to place them in non-conducting condition. The grids 174, 176 of the cathode followers of the gated buffer section 110 are connected in parallel over conductor 178 and receive the amplified dynamic strain signal from the cathode follower 102.

The outputs of the dual cathode followers 166, 168 of the gated buffer section are applied over parallel branch conductors 180, 182 to the respective inputs of the one-shot cathode coupled multi-vibrators 112, 122 which are set to trigger at different input voltage levels in accordance with the setting of the adjustable biasing potentiometers 184, 186 in their respective input circuits. The multi-vibrator 112 is set to trigger when the instantaneous amplitude of the dynamic load signal attains a value lying within the range $l_a$ to $l_c$ of Fig. 1 corresponding to the selected range of hardness acceptance values while both of the multi-vibrators 112 and 122 are set to operate when the dynamic load signal rises above the dynamic load $l_c$ within the aforesaid definite timing interval, indicating that the test specimen is too hard. If the gated buffer section 110 has closed or interrupted the dynamic output signal from cathode follower 102 before the dynamic strain signal has attained the lower limit $l_a$ of curve A of Fig. 1, neither one of the multi-vibrators 112 or 122 will trigger, indicating that the material specimen is too soft.

As illustrated in Fig. 6B, the output of the multi-vibrator 112 is taken from the plate 188 of the second section thereof and applied through condenser 190 as a positive pulse, when the second section thereof becomes non-conducting, to the input of the thyratron 114 causing the latter to fire and to energize the operating coil 192 of the first control or sorting relay 116 ($CR_1$). The circuit of the multi-vibrator 122 may be similarly traced from input conductor 182, plate 194 of the second section thereof, through condenser 196 to the thyratron 124 having the operating coil 198 of the second control or sorting relay 126 ($CR_2$) in the plate circuit thereof.

The manner in which the contacts of the various relays illustrated in Fig. 6B are interassociated with the memory and solenoid relays of the hardness sorting or classifying system of the present invention may be seen from the control diagram schematically illustrated in Fig. 7, which includes a pair of line conductors 210, 212 having a plurality of parallel branch circuits connected for energization therefrom as follows. One of these branch circuits includes a conductor 214 connected to line conductor 210 and to one of the contacts of a normally open cam limit switch 216 ($CS_1$) the other side or contact of which is connected over conductor 218 to the coil 220 of a third control relay $CR_3$ the other side of which is connected by conductor 222 to line conductor 212. The cam limit switch $CS_1$ is one of a series of three cam actuated switches associated with a series of cams 226, 228, 230 which are shown in Fig. 3. The switches are mounted on the shaft 53 of speed reducer 52 and are driven in synchronism with the beam cam 48 and indexing mechanism of the table 12, and are caused to close their contacts momentarily and in sequence once during each indexing cycle of the table. The function of the cam switches will appear more fully below.

A second branch circuit between the line conductors of Fig. 7 includes a conductor 234 connected to line conductor 210 and to one side of another normally open set of contacts of a further cam limit switch 236 ($CS_3$) the other side or contact of which is connected by conductor 238 in a series circuit to the normally closed contacts 240 of control relay $CR_2$, conductor 242, normally open contacts 244 of control relay $CR_1$, conductor 246, the operating coil 248 of memory relay $MR_1$ and conductor 250 connected to line 212. Shunting the contacts 236, 240 and 244 of the above traced circuit is a hold-in circuit for the operating coil of $MR_1$. This circuit includes conductor 254 connected to line conductor 210 and to one side of a normally closed set of contacts 256 ($CS_2$) of another cam operated switch the opposite side or contact of which is connected over conductor 258 to one side of a normally open first set of contacts 260 of memory relay $MR_1$, the other contact of which is connected by conductor 262 to conductor 246, as shown. A sub-branch circuit for memory relay ($MR_2$) includes conductor 266 connected between conductor 238 and one side of a set of normally open contacts 268 of control or sorting relay $CR_2$ the other side or contact of which is connected over conductor 270 to the one side of the operating coil 272 of $MR_2$ the other side of which is connected over conductor 274 to line conductor 212. A hold-in circuit for $MR_2$ operating coil 272 includes conductor 280 connected between conductor 258 and one side of a first set of normally open contacts 282 of MR₂ the other side or contact of which is connected over conductor 284 to conductor 270, as shown.

Another branch circuit between the line conductors 210 and 212 includes conductor 290 connected to line conductor 210, a second set of normally open contacts 292 of memory relay MR₁, conductor 294 to "good to hard" driving solenoid 80 and then to conductor 298 connected to line conductor 212. Another branch circuit includes conductor 300 connected to line conductor 210, a second set of normally open contacts 302 of memory relay MR₂, conductor 304, coil 82 of "too-hard or over-hardness" solenoid and conductor 308 connected to line conductor 212.

The relay CR₃ is an auxiliary control relay which includes a set of normally closed contacts 312 shown in Fig. 6B connected in a circuit from B+ line 314, contacts 312, and conductor 316 over which operating voltage is supplied from line 314 to the plates 170, 172 through resistor 164 of the dual cathode-follower gated buffer section 110. A conductor 318 is connected to conductor 316 for supplying operating voltage from B+ line 314 through the normally closed contacts 312 to the plate circuits of the thyratrons 114 and 124 associated with the control sorting relays CR₁ and CR₂. The operating coil 220 (Fig. 7) of auxiliary control relay CR₃ is connected for energization from line conductors 210, 212 through the normally open contacts 216 of cam operated switch CS₁ which, when momentarily operated, completes the circuit of coil 220 and momentarily opens contacts 312 and interrupts the operating voltage supplied to the sections of the gated buffer 110, thyratron 108, and thyratrons 114 and 124 thereby clearing the control or sorting relay circuits CR₁ and CR₂.

For purpose of illustration, it will be assumed that the various relay circuits have been cleared and that the contacts associated with the aforementioned relays are in the positions illustrated in Fig. 6B and Fig. 7. Assuming that the dynamic strain signal has attained a sufficiently high level to cause the energization of coil 192 of control relay CR₁, contacts 244 thereof shown in Fig. 7 will close. Contacts 240 of control relay CR₂ will remain in their normally closed position, for it is assumed that the operating coil 198 thereof was not energized before closure of the gate section 110. The operating coil 248 of memory relay MR₁ will not be energized until the closure of contacts 236 of the cam operated switch CS₃ at a preselected time during the indexing cycle. The momentary closure of CS₃ will then establish an energizing circuit for the operating coil of MR₁, and also a hold-in circuit through the normally closed contacts 256 of CS₂ and the now closed contacts 260 of MR₁. Energization of MR₁ will complete an energizing circuit through the second set of contacts 292 thereof to the driving solenoid 80 associated with the diverter member 62 and will cause the latter to be displaced about its pivot shaft 72 and be aligned, say, with chute 66, classifying the specimen within the good range of hardness acceptance values. Upon operation of the cam switch CS₂, the contacts 256 thereof are caused to open momentarily during the indexing cycle to interrupt the hold-in circuit of memory relay MR₁, thus clearing the contacts of the latter.

From the foregoing, it will be seen that the information relating to the condition of the energization of the operating coils 192, 198 and the position of the contacts of the control or sorting relays CR₁ and CR₂ is transferred from the sorting relays to the memory relays by the cam operated switch CS₃, that the sorting relay circuits are then cleared by the cam operated switch CS₁ and that the memory relays are cleared by the operation of CS₂. The proper timing and sequence of the foregoing operations is accomplished by appropriate setting of the cams 226, 228 and 230 on the shaft of the speed reducer.

Although a specific embodiment of the invention has been shown and described, it will be understood that it is but illustrative and that various modifications can be made therein without departing from the scope and spirit of the invention.

We claim:

1. Apparatus for checking and sorting material specimens in accordance with their relative hardness values comprising, in combination, means for applying a predetermined penetrating load to a specimen, transducer means abutting said specimen and developing an electrical signal varying in accordance with the dynamic strain induced in said specimen in response to the application of said load thereto, electrical utilizing means connected with said transducer means including a pair of control relay circuits therein operative at different voltage levels of the dynamic strain signal and sorting means operated by said control relay circuits, and time operated-switching means responsive to said electrical strain signal and operably connected between said transducer means and said utilizing means interrupting the transmission of said dynamic strain electrical signal to said control relay circuits of said utilizing means after the elapse of a predetermined period of time.

2. Apparatus for checking the relative hardness of material specimens at a hardness checking station and for classifying said specimens as to hardness at a sorting or disposal station, said apparatus comprising, in combination, conveyor means for carrying a specimen to be tested to said checking station and then to said sorting station, means for applying a predetermined penetrating load to said specimen at said checking station, strain sensing means abutting said specimen developing a continuous electrical signal representative of the dynamic strain induced therein in response to said load applied thereto at said checking station, and utilizing means connected to said sensing means and responsive to said electrical signal, said utilizing means including control means therein actuated at different voltage levels of the electrical signal corresponding to the dynamic strain in a specimen, memory storing means actuated by said control means in accordance with the condition of actuation thereof during checking of said specimen at said checking station, and sorting means at said disposal station operated by said memory storing means classifying said specimen as to hardness upon arrival at the disposal station in accordance with the condition of actuation of said control means of said specimen at the said checking station.

3. Apparatus for measuring the relative hardness of material specimens comprising, in combination, means for supporting said specimen, a penetrator, means connected to said penetrator for applying a predetermined penetrating load to said specimen, electrical strain sensing means responsive to the load applied to said specimen and developing an electrical signal that is representative of the dynamic strain induced in the specimen and has a characteristic that increases continuously from the time of application of the load to the specimen up to the time that the dynamic strain in the specimen attains the value of the applied load, measuring means connected to said strain sensing means and responsive to said characteristic of said electrical signal developed thereby, and fixed time operated switching means connected between said strain sensing means and said measuring means operative to interrupt the transmission of said electrical signal to said measuring means after a fixed period of time that is less than the time interval in which the specimen strain attains the value of the applied load.

References Cited in the file of this patent

UNITED STATES PATENTS

| | | |
|---|---|---|
| 2,539,998 | Holland-Martin et al. | Jan. 30, 1951 |
| 2,554,206 | Pearson et al. | May 22, 1951 |
| 2,570,485 | Rieber | Oct. 9, 1951 |
| 2,619,831 | Sklar | Dec. 2, 1952 |
| 2,640,591 | Sieggreen | June 2, 1953 |